March 26, 1940.  H. A. HERNDON  2,194,792
SHOCK ABSORBER
Filed May 21, 1938
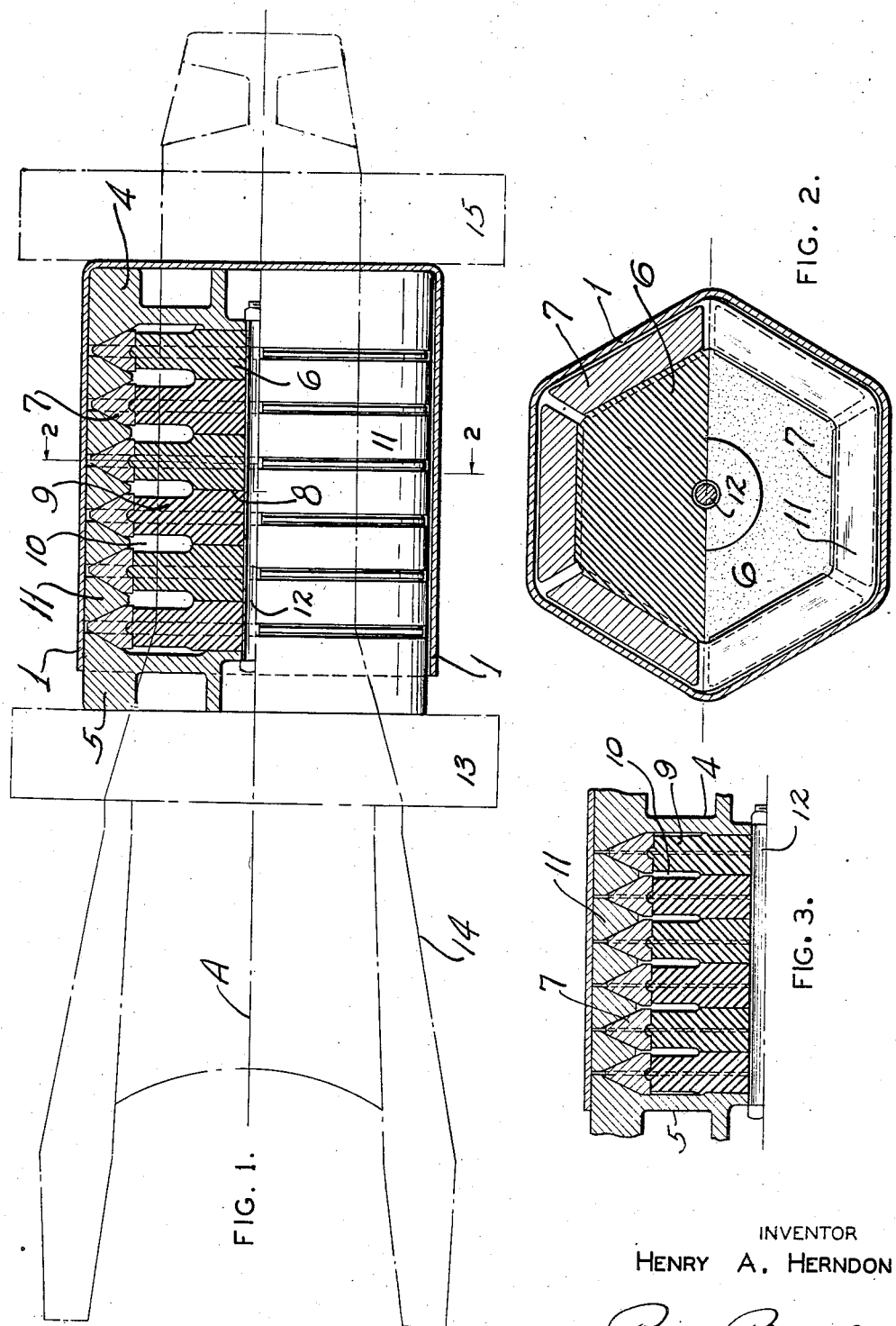
INVENTOR
HENRY A. HERNDON
BY Rodney Bedell
ATTORNEY Patented Mar. 26, 1940

2,194,792

UNITED STATES PATENT OFFICE 2,194,792

SHOCK ABSORBER

Henry A. Herndon, Washington, D. C.

Application May 21, 1938, Serial No. 209,178

8 Claims. (Cl. 213—40)

The invention relates to shock absorbing devices involving a combination of friction and yielding elements.

The accompanying drawing and the following description refer to an embodiment of the invention in railway draft gear but it could be used in snubbers for railway truck spring nests or in any other cushioning device.

The main object of the invention is to cushion the shock effectively with a simple structure, the capacity and movement of which may be easily fixed to meet the conditions in which the device is to operate.

Another object of the invention is to utilize the uniformly yielding characteristics of rubber in a shock absorbing device in other ways than by merely compressing the rubber elements between unyielding members.

Another object of the invention is to obtain a large frictional bearing area with comparatively small parts which are simply and economically produced and readily maintained in assembled relation with each other and the other parts of the device.

These and other detailed objects of the invention are attained by the structure in the accompanying drawing, in which—

Figure 1 is a longitudinal section and view of a shock absorbing device embodying the invention shown in combination with other parts common to railway draft gear installation.

Figure 2 is a transverse section taken on the line 2—2 of Figure 1.

Figure 3 is a detail section corresponding to Figure 1 but showing the parts in a different position.

The yielding and friction elements are housed in a light metal shell or casing 1 open at one end and closed at the opposite end. A thrust transferring member 4 is seated in the inner end of casing 2 and a corresponding thrust transferring member 5 is received in the open end of the casing.

A plurality of yielding and friction units are disposed between members 4 and 5, and each unit comprises a pad 6 of rubber, or other similarly yielding material, and a plurality of metal segments 7 vulcanized or otherwise secured to the periphery of the pad. Preferably, but not necessarily, the central portions of the pads are thickened and abut the adjacent pads, as indicated at 8, and the outer portion 9 of each pad is of reduced thickness providing ample space 10 between adjacent pads for distortion of portions 9.

Each segment 7 has a wedge section tapering outwardly from the axis of the mechanism, and between the segments of successive units are cooperating wedge rings 11 slidable within the casing and each having inwardly converging faces corresponding to the outwardly converging faces of segments 7.

All of the parts mounted in the casing are held in assembled relation with each other by the retainer bolt 12.

13 indicates a follower block disposed to transmit thrust between the head of the coupler yoke 14 to member 5, and also to engage the draft gear forward stops (not shown) applied to the car sills (not shown). 15 indicates a follower block disposed to transmit thrust between the inner end of the device and the tail of the coupler yoke and also to engage the draft gear rear stops (not shown) on the car sills.

Upon a blow or other longitudinal force being applied in a righthand direction along the axis A of the mechanism, the pressure transmitted through follower 13 will tend to move member 5 towards member 4 (the latter being held against movement by the draft gear rear stops, not shown), and rings 11 will be moved towards each other and the opposed inclined faces on rings 11 and segments 7 will tend to force the latter inwardly of the device, thereby distorting the rubber pads, as indicated in Figure 3.

Upon release of the compressive force, the elasticity of pads 6 will tend to thrust segments 7 outwardly and thereby separate rings 11 and return the device to its original position.

Draft forces applied in the opposite direction by movement of yoke 14 to the left will move the casing and member 4 towards member 5 and follower 13 (the latter being held against movement by the draft gear forward stops, not shown), and the functioning of the device will be identical with that previously described.

Either movement of members 4 and 5 exerts thrust directly on the rubber core longitudinally of the device independently of the thrust on the rubber core exerted transversely of the device by element 7 and the pressure on the rubber pads exerted longitudinally of the device tends to distort the pads so that the rubber flows radially of the device just as the pressure transversely of the device tends to distort the pads so the rubber flows longitudinally of the device.

It appears convenient to mount each peripheral series of wedge segments 7 upon an individual pad 6 but the rubber core may consist of a single block of rubber, or like material, having recesses, as indicated at 16 for example, to permit distortion of the pad as segments 7 are moved toward the axis of the device or as pressure is applied longitudinally to the more solid portion of the core.

The structure described provides for the attainment of the objects set forth in the introductory part of the specification. There is a long central mass of rubber between and receiving the thrust from the end cap members 4 and 5. The tendency of the rubber to flow radially is resisted by the centripedal thrust upon segments 7, and the resistance of the rubber to distortion is multiplied by the frictional contact between the wedge-like faces of elements 7 and 11. By varying the angles of the wedge faces and increasing or decreasing the open spaces 10, any desired capacity may be obtained and the device adapted for light or heavy duty. Similar adaptability is afforded by increasing or decreasing the number of successive friction and yielding units.

While the casing as shown affords some protection from dirt and moisture, its presence is not essential as it does not constitute a working part of the mechanism.

As previously indicated, the device may be used as a snubber to break up synchronization of coil springs and in the use of the term "shock absorber" in this specification it is to be understood that the term covers devices constructed as described irrespective of the manner in which they are used.

Other changes in details, as will occur to those familiar with the art, may be made without departing from the spirit of the invention and the exclusive use of such modifications as come within the scope of the claims is contemplated.

I claim:

1. In a device of the class described, members of rigid material spaced apart longitudinally of the direction of application of a force to be dissipated, a pad of rubber-like material, and elements of non-yielding material mounted on said pad, said members and elements including wedge structure tending to distort said pad when the device is subjected to said force.

2. In a device of the class described, a disc-like pad of yielding material disposed transversely of the line of force to be dissipated, a plurality of elements of non-yielding material mounted on the periphery of said pad and each having outwardly converging faces, members at opposite sides of said elements and having inwardly inclined faces engaging the converging faces of said elements, means for transmitting thrust to said members along said line of force and a casing confining said members against movement radially of said pad when said members are subjected to said force.

3. In a device of the class described, members of rigid material spaced apart longitudinally of the axis of the device and having surfaces inclined inwardly and diagonally of said axis, a flat disc of yielding material disposed transversely of said axis, elements of non-yielding material carried on the edge of said disc and having outwardly inclined surfaces opposing said member surfaces whereby a force applied to said members along said axis moves said elements transversely of said axis to deform said disc.

4. In a device of the class described, a casing, a series of rings disposed transversely of the axis of said casing and slidable lengthwise of said casing, a series of rubber pads abutting each other lengthwise of said casing with their peripheries spaced inwardly of said rings, there being open spaces between rigid portions of said pads when they are in normal position and rigid elements mounted on the edges of said pads, said rings and elements including interengaging wedge structure tending to distort said pads when said rings are moved towards each other.

5. In a device of the class described, spaced thrust-transmitting members, a mass of rubber or similar yielding material extending continuously between said members and yieldingly resisting their movement towards each other along the axis of the device, said mass having portions movable transversely of said axis when pressure is applied to said mass by said members, metal elements mounted on said portions to receive outward thrust from said mass as it is compressed between said members, and metal parts frictionally engaging said elements to resist their outward movement.

6. In a device of the class described, spaced thrust-transmitting members, a block of rubber or similar material with a solid central portion extending between said members and resisting their movement towards each other, there being lateral projections from said portion free of direct pressure from said members, rigid elements carried on said projections, cooperating devices surrounding said elements and having faces slidably engaging said elements, the friction between said faces and elements being increased as said block is distorted by pressure from said members, said members and the end ones of said elements having direct contact with each other irrespective of the deformation of said block.

7. In a device of the class described, members spaced apart longitudinally of the direction of forces applied to the device, elements spaced apart transversely of said direction, means for moving said members towards each other and said elements towards each other when force is applied to the device, and a yielding structure directly opposing said members and elements to resist all of such movements, said yielding structure comprising a block of rubber or like material extending longitudinally of the device between said members and extending transversely of the device between said elements and directly receiving the thrust transmitted through said members and through said elements.

8. In a device of the class described, a core of rubber or like material having a polygonal side periphery, a plurality of elements of rigid material disposed about said periphery and movable relative to each other and to and from the axis of said core, such movements being accompanied by distortion of said core, rigid rings surrounding said core and elements and having frictional sliding engagement with said elements, and means for transmitting thrusts longitudinally of the device to said core and to said elements and rings to thereby distort said core axially and radially and increase the friction between said rings and elements.

HENRY A. HERNDON.